United States Patent [19]

Schumacher

[11] Patent Number: 4,866,993

[45] Date of Patent: Sep. 19, 1989

[54] TORQUE TRANSDUCER FOR ROTATING MACHINES

[76] Inventor: Larry L. Schumacher, 18876 Tenderfoot Trail, Newhall, Calif. 91321

[21] Appl. No.: 139,442

[22] Filed: Dec. 30, 1987

Related U.S. Application Data

[63] Continuation-in-part of Ser. No. 940,802, Dec. 12, 1986, abandoned.

[51] Int. Cl.$^4$ .............................................. G01L 3/14
[52] U.S. Cl. .................................................. 73/862.33
[58] Field of Search ........................ 73/862.33, 862.32; 180/79.1

[56] References Cited

U.S. PATENT DOCUMENTS

| | | | |
|---|---|---|---|
| 1,946,099 | 2/1934 | Norton | 73/862.33 |
| 2,519,378 | 8/1950 | Kilpatrick | 73/862.32 X |
| 2,635,465 | 4/1953 | White | 73/862.32 |
| 4,173,265 | 11/1979 | Kremer | 73/862.33 X |
| 4,635,741 | 1/1987 | Morishita et al. | 73/862.33 X |

FOREIGN PATENT DOCUMENTS

| | | | |
|---|---|---|---|
| 53477 | 4/1977 | Japan | 73/862.32 |
| 67832 | 4/1982 | Japan | 73/862.33 |
| 111028 | 6/1984 | Japan | 73/862.33 |
| 790692 | 2/1958 | United Kingdom | 73/862.33 |

Primary Examiner—Charles A. Ruehl

[57] ABSTRACT

The torque transducer for rotating machines enables precise measurement of the torque transmitted between a torquing means and a driven load at any rotational speed. A torsionally compliant means is concentrically attached between the torquing means and load shaft attached to the driven load. The torsionally compliant means' angular deformation representing torque is measured between capacitive elements attached to the torquing means and capacitive elements attached to structure attached to the load shaft. An electronic circuit transforms the differential capacitance created by the torsionally compliant means's angular deformation to a voltage proportional to torque.

7 Claims, 2 Drawing Sheets

TORQUE TRANSDUCER FOR ROTATING MACHINES

This application is a Continuation-in-Part of pending prior application Ser. No. 940,802 filed on Dec. 12, 1986 of Larry L. Schumacher for Torque Transducer for Rotating Machines, now abandoned.

FIELD OF THE INVENTION

This invention relates to torquemeters for continously determining torque transmitted to a rotating load.

BACKGROUND OF THE INVENTION

Many rotating applications require a precise knowledge of the torque applied to the rotating load to effect the required control of the torquing means. Torque in a rotating shaft has previously been determined using strain gages attached to the rotating shaft. The torque resolution of these systems is poor and the outputs are noisy resulting in poor torque knowledge and control, or the controlled shafts are too flexible resulting in mechanical failure or undesired control instabilities. Additionally, strain gage systems are labor intensive to manufacture and maintain.

Accordingly, the objects of this invention are: to provide an improved torque transducer for rotating applications that has good torque resolution over the entire operational speed range, and to provide an easily manufactured, low noise torque transducer.

SUMMARY OF THE INVENTION

The present invention is a mechanism that measures, at any rotational speed, the torque transmitted from a torquing means to a driven load.

The torquing means may be a gear, pulley or motor that torques the shaft attached to the driven load through a torsionally compliant means. The angular deformation of the compliant means is proportional to the torque transmitted to the shaft and is measured around the shaft axis between deformation measurement structure representing the compliant means angular deformation at the compliant means and shaft attachment, and deformation measurement structure representing the compliant means angular deformation at the compliant means and torquing means attachment. The angular deformation between the torquing means and load shaft is transformed to electrical characteristics by capacitive elements attached to rotationally balanced deformation measurement structures attached to both the torquing means and the load shaft. The capacitive electrical characteristics are transformed to a voltage proportional to torque by an electronic circuit. The described objects and advantages of the Torque Transducer for Rotating machines will become more apparent in the following detailed description.

DETAILED DESCRIPTION OF THE INVENTION

Figure 2:
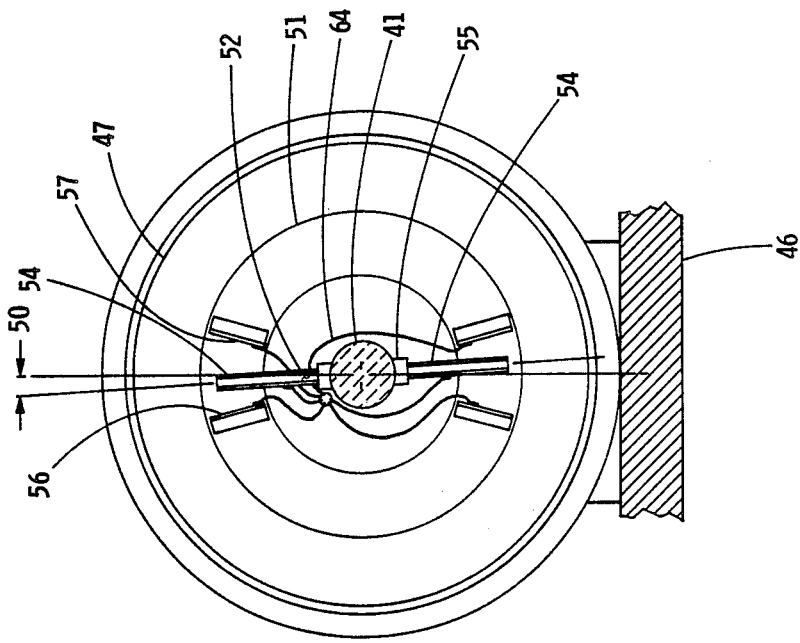
FIG. 2 is a end view of the preferred embodiment of the rotationally balanced deformation measurement means.
Figure 1:
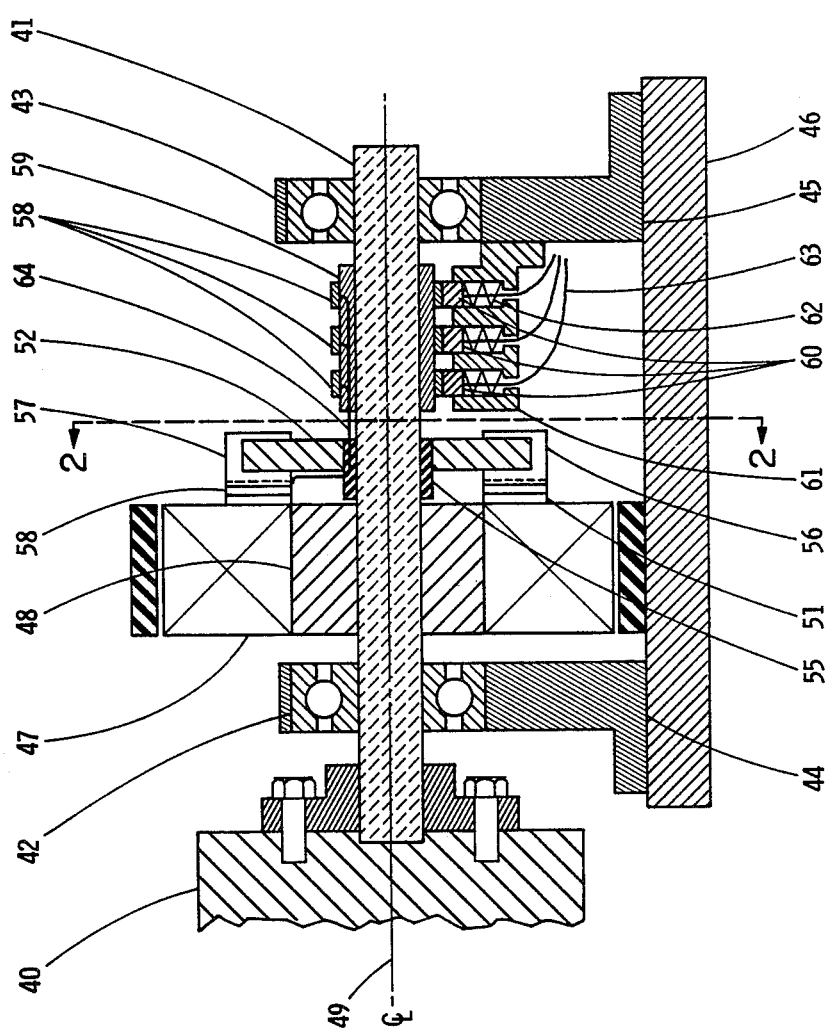
FIG. 1 is a section view of the preferred embodiment of the torque transducer for rotating machines.

FIGS. 1 and 2 illustrate the torque transducer for rotating machines. Torque transmission shaft 41 is rotationally supported relative to support structure 46 by bearings 42, 43 and bearing support structures 44, 45. Torquing means 47 may be a gear, pulley, motor or other torquing mechanism that torques shaft 41 relative to structure 46 around axis 49. Torquing 47 means has a cylindrical concentric attachment to torsionally compliant means 48, and torsionally compliant means 48 has a cylindrical concentric attachment with shaft 41 between shaft support bearings 42, 43.

Torsional resistance of load 40, bearings 42, 43 and slip rings 60 to torquing means 47 angularly deforms compliant means 48 around shaft 41. The angular deformation 50 of compliant means 48 is proportional to the torque between torquing means 47 and shaft 41. Since the torquing means 47, compliant means 48, shaft 41 and load 40 may rotate at high rotational speed, the angular deformation of compliant means 48 is measured with a rotationally balanced deformation measurement means consisting of:

a deformation reference structure 51 with insulatingly attached electrical capacitive elements 56, 57 is fixedly attached to torquing means 47 so that the mass center of all deformation reference structure and attached electrical capacitive elements is on axis 49;

a deformation pointer structure 52 with insulatingly attached electrical capacitive elements 54 is fixedly attached to shaft 41 so that the mass center of all deformation pointer structure and attached electrical capacitive elements is on axis 49. The angular deformation 50 of the compliant means 48 is proportional to the torque transmitted from torquing means 47 to the shaft 41. The angular deformation 50 around the shaft axis 49 is measured between the deformation pointer structure 52, and deformation reference structure 51.

Figure 3:
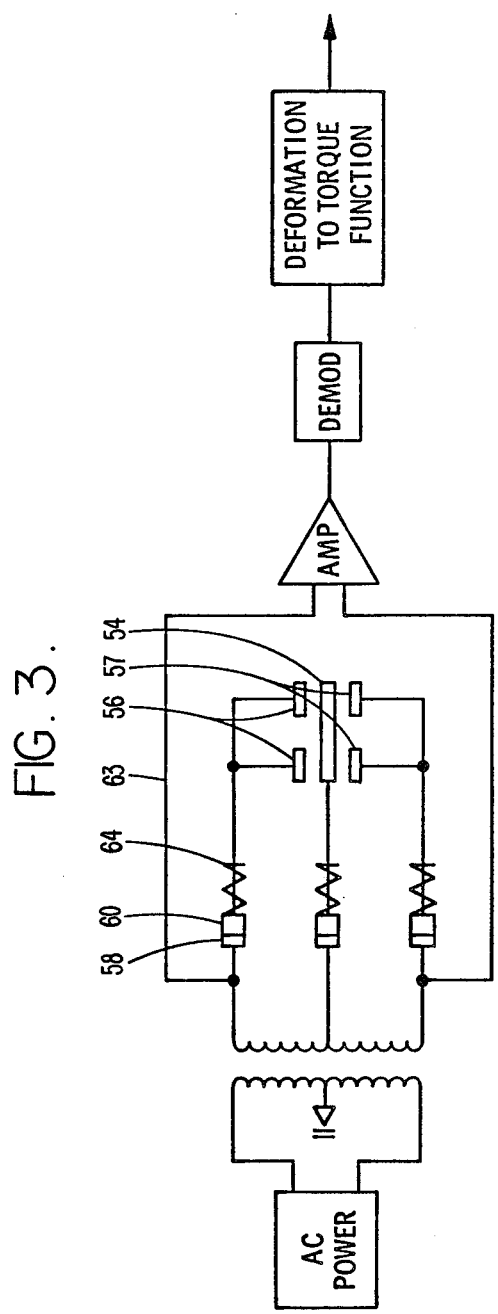
FIG. 3 is an electrical schematic of the preferred embodiment of the electronic circuit.

Angular deformation 50 between deformation reference structure 51 and deformation pointer structure 52 is transformed to electrically measurable characteristics by the differential electrical capacitance between capacitive elements 54 and 56, and capacitive elements 54 and 57 which is converted into an electrical signal proportional to the torque between torquing means 47 and shaft 41 by circuit 26 (see FIG. 3).

FIG. 1 illustrates that electrical power and signals are transmitted to and from the electrical capacitive elements 54, 56, 57 by conductive slip rings 58 attached to shaft 41 by insulating means 59. Electrically conductive brushes 60 are constrained from rotation by brush holder 61 attached to support means 45, and are held in contact with rotating rings 58 by springs 62. Electrically conductive means 63 connects brushes 60 to electronic circuit 26, and electrically conductive means 64 connects slip rings 58 to electrical capacitive elements 54, 56, 57.

Having described the invention I claim:

1. A torque transducer for rotating machines comprising:

a torque transmission shaft being supported by at least two support bearings and transmitting torque at any rotational speed to a rotational load attachment;

a torquing means providing torque to the torque transmission shaft between the support bearings;

a torsionally compliant means transmitting torque between a cylindrical concentric attachment to the torquing means and a cylindrical concentric attachment to the torque transmission shaft;

a rotationally balanced deformation measurement means measuring the angular deformation of the torsionally compliant means;

an electronic circuit transforming the rotationally balanced deformation measurement means angular measurement into a voltage proportional to torque.

2. The torque transducer of claim 1 wherein the torquing means is a cylindrical structure attached to the torsionally compliant means concentric with the torque transmission shaft, between the support bearings, the torquing means being operational to torque the torque transmission shaft at any rotational speed.

3. The torque transducer of claim 1 wherein the torsionally compliant means comprises torsionally compliant cylindrical structure fixedly attached to an internal cylindrical surface structure of the torquing means and fixedly attached to an exterior cylindrical surface structure of the torque transmission shaft, the torsionally compliant means transmitting torque between the torquing means and the torque transmission shaft between the torque transmission shaft rotational support bearings.

4. The torque transducer of claim 1 wherein the rotationally balanced deformation measurement means comprises:

a deformation reference structure being attached to the torquing means;

a deformation pointer structure being attached approximately coplanar with the deformation reference structure to the torque transmission shaft;

electrical sensing means elements being attached to the deformation pointer and the deformation reference structure;

the rotationally balanced deformation measurement means measuring, at all rotational speeds, an angular deformation of the torsionally compliant means around the torque transmission shaft between the torquing means and the torque transmission shaft.

5. The torque transducer of claim 4 wherein the deformation reference structure further comprises structure with insulatingly attached electrical sensing means elements being attached to the torquing means and having a mass center on the torque transmission shaft's rotational axis.

6. The torque transducer of claim 4 wherein the deformation pointer structure further comprises structure with insulatingly attached electrical sensing means elements being attached, approximately coplanar with the deformation reference structure, to the torque transmission shaft between the torque transmission shaft rotational supoort bearings and having a mass center on the torque transmission shaft's rotational axis.

7. The torque transducer of claim 4 with slip rings connecting the electronic circuit to the electrical sensing means elements rotating with the deformation pointer structure and the electrical sensing means elements rotating with the deformation reference structure, the electronic circuit first amplifying then demodulating an electrical signal from the electrical sensing means elements.

* * * * *